(12) United States Patent
Foo et al.

(10) Patent No.: US 11,952,517 B2
(45) Date of Patent: Apr. 9, 2024

(54) BACK-OFF PREVENTING RESEALABLE ADHESIVES

(71) Applicant: Henkel AG & CO. KGaA, Duesseldorf (DE)

(72) Inventors: Winston Foo, Flemington, NJ (US); Alexis Kriegl, Washington, NJ (US); Christopher Wolpert, Stamford, CT (US); Nicholas Bull, Ridgefield, CT (US)

(73) Assignee: HENKEL AG & CO. KGaA, Duesseldorf (DE)

( * ) Notice: Subject to any disclaimer, the term of this patent is extended or adjusted under 35 U.S.C. 154(b) by 283 days.

(21) Appl. No.: 17/467,726

(22) Filed: Sep. 7, 2021

(65) Prior Publication Data

US 2021/0403761 A1   Dec. 30, 2021

Related U.S. Application Data

(63) Continuation of application No. PCT/US2020/024995, filed on Mar. 26, 2020.

(Continued)

(51) Int. Cl.
*C09J 5/06* (2006.01)
*B65B 7/28* (2006.01)
(Continued)

(52) U.S. Cl.
CPC ............... *C09J 5/06* (2013.01); *B65B 7/2835* (2013.01); *B65B 7/2871* (2013.01);
(Continued)

(58) Field of Classification Search
CPC ...... B65D 1/0246; B65D 1/023; B65D 41/04; B65D 41/0457; B65D 41/0435;
(Continued)

(56) References Cited

U.S. PATENT DOCUMENTS 4,519,859 A   5/1985 Roth et al.
4,560,566 A   12/1985 Roth et al.
(Continued)

FOREIGN PATENT DOCUMENTS

CN   1759006 A   4/2006
DK   82283 A    9/1983
(Continued)

OTHER PUBLICATIONS

International Search Report & Written Opinion PCT/US2020/024995 Completed: Jul. 13, 2020; dated Jul. 13, 2020 12 Pages.

*Primary Examiner* — Robert J Hicks
(74) *Attorney, Agent, or Firm* — Sun Hee Lehmann

(57) ABSTRACT

Adhesive compositions that replace gaskets and liners in sealing applications for packages that are detachable with hand force are described. The adhesive compositions are particularly useful in preventing leaks and spillage during storage and transport of its packaged contents. Advantageously, the adhesive composition provides packages with (1) a removal torque of from about 4 to about 20 in-lb and (2) resealable torque on subsequent openings of from about 2 to about 15 in-lb, measured in accordance to ASTM D2063.

15 Claims, 2 Drawing Sheets

Related U.S. Application Data

(60) Provisional application No. 62/826,267, filed on Mar. 29, 2019.

(51) Int. Cl.
*B65D 1/02* (2006.01)
*B65D 41/04* (2006.01)
*C09J 123/08* (2006.01)
*C09J 131/04* (2006.01)

(52) U.S. Cl.
CPC ....... *B65D 1/0246* (2013.01); *B65D 41/0457* (2013.01); *C09J 123/0853* (2013.01); *C09J 131/04* (2013.01); *C09J 2423/00* (2013.01); *C09J 2431/00* (2013.01); *C09J 2491/00* (2013.01)

(58) Field of Classification Search
CPC .. C09J 5/06; C09J 123/0853; C09J 123/0846; C09J 131/04; C09J 131/02; C09J 2423/00; B65B 7/2835; B65B 7/2871; B65B 7/2878
USPC ...................... 215/44, 45, 43, 316, 329, 232; 220/359.4, 359.1, 293, 288; 53/478, 477
See application file for complete search history.

(56) References Cited

U.S. PATENT DOCUMENTS

| | | |
|---|---|---|
| 4,585,135 A | 4/1986 | Sinnott |
| 4,813,947 A | 3/1989 | Korpman |
| 5,112,554 A | 5/1992 | Perez et al. |
| 5,779,073 A | 7/1998 | Milhomme |
| 9,499,311 B1 | 11/2016 | Gilliam |
| 2003/0082371 A1 | 5/2003 | Mazurek et al. |
| 2005/0049340 A1 | 3/2005 | Matsuo et al. |
| 2012/0273496 A1* | 11/2012 | Lourido ............... C08K 3/26 427/427.4 |
| 2018/0297828 A1 | 10/2018 | Orlich et al. |
| 2020/0172282 A1* | 6/2020 | Hasegawa ............ B65D 1/0246 |

FOREIGN PATENT DOCUMENTS

| | | | | |
|---|---|---|---|---|
| EP | 0089679 A2 | | 9/1983 | |
| GB | 401616 A | | 11/1933 | |
| GB | 1503667 A | * | 3/1978 | .......... B65B 7/2878 |
| JP | S60201932 A | | 10/1985 | |
| JP | H01141980 A | | 6/1989 | |
| JP | 2001517585 A | | 10/2001 | |
| JP | 2017110100 A | | 6/2017 | |
| WO | 9915422 A1 | | 4/1999 | |
| WO | 03036105 A1 | | 5/2003 | |
| WO | 2004080826 A2 | | 9/2004 | |
| WO | 2014186572 A2 | | 11/2014 | |

* cited by examiner

BACK-OFF PREVENTING RESEALABLE ADHESIVES

FIELD OF THE INVENTION

The invention relates to adhesive compositions that replace gaskets and liners in sealing container closures that are detachable by hand force. The present adhesive compositions are particularly useful in preventing back-off torques for container closures and thus, prevents leaks and spillage during storage and transport of the container contents.

BACKGROUND OF THE INVENTION

Threadlocking adhesives are typically used to prevent back-off torques and to adhesively bond and interlock engageable structural fasteners to a final state. Such threadlocking adhesives have strong adhesion and they are not detachable by hand force. Low force threadlocking adhesives are also available but once the adhesion is broken, the adhesives no longer have any cohesive force and no longer interlock.

With the rise of e-commerce, delivery of liquid and gel goods for consumers are on the rise. The containers and packages that house the liquid and/or gel goods must be leakproof and provide safe delivery of the goods.

Containers are sealed to prevent loss of their contents during storage and transport. Application torque is applied to the closure of the containers to seal the content; however, some torque is lost over time and handling, and this phenomenon is known as back-off. To compensate for this back-off torque, higher initial application torque may be applied, which can lead to damaged containers, equipment wear, or prevent consumers from opening the container with mere hand force. Additional gaskets, induction seal liner, inner seal, valve seal or liners are often applied to the containers to prevent leaks; or a secondary plastic liner or foam bag liner is added to the container, increasing cost and complexity and carbon footprint of the goods. Moreover, these additional seals add more steps to the packaging process, which require several retooling (and shipping to and from) the production line, further increasing carbon footprint.

There is an ongoing need for a more sustainable solution that minimizes carbon footprint, cost and complexity, while maintaining seals to containers and packages during transport and even subsequent to opening the container. The current invention addresses this need in the art.

SUMMARY OF THE INVENTION

The invention provides a replacement for or in addition to a tape, gasket, liner or induction seal in containers and packages.

One aspect of the invention is directed to an article of manufacture comprising a first threaded member, and the threads of the threaded member is partially coated with a resealable adhesive. The resealable adhesive is a hot melt adhesive.

Another aspect of the invention provides an article of manufacture comprising the first threaded member of above, and additionally a second threaded member matingly engaged with the first threaded member, whereupon the resealable adhesive is coated between the first and the second threaded members. The resealable adhesive is a hot melt adhesive characterized as having (1) a removal torque of from about 4 to about 20 in-lb, measured in accordance to ASTM D2063; and (2) a resealability torque of from about 2 to about 15 in-lb, measured in accordance to ASTM D2063.

In another aspect, the invention provides an article of manufacture comprising a non-threaded closure member having a circumference or perimeter dimension and a height dimension. The closure member is at least partially coated with a resealable adhesive comprising a hot melt adhesive.

In a further aspect, the invention provides an article of manufacture comprising the non-threaded closure member of above and a second non-threaded member matingly engaged with the first non-threaded member, whereupon the resealable adhesive is coated between the first and the second non-threaded members. The resealable adhesive is a hot melt adhesive characterized as having (1) a removal torque of from about 4 to about 20 in-lb, measured in accordance to ASTM D2063; and (2) a resealability torque of from about 2 to about 15 in-lb, measured in accordance to ASTM D2063.

Yet another aspect of the invention provides a method of sealing threaded members comprising:
(a) providing a first threaded member;
(b) providing a second threaded member capable of matingly engaging with said first threaded member;
  at least one of the said first and second threaded members being at least partially coated with a resealable coating composition; and
(c) matingly engaging said first and second threaded members.

The resealable coating composition substantially fills the matingly engaging space between the first and the second threaded members. The resealable coating composition is a hot melt adhesive characterized as having (1) a removal torque of from about 4 to about 20, measured in accordance to ASTM D2063; and (2) a resealability torque of from about 2 to about 15 in-lb, measured in accordance to ASTM D2063.

Another aspect of the invention provides a method of sealing non-threaded members comprising:
(a) providing a first non-threaded member having a circumference or perimeter dimension and a height dimension;
(b) providing a second non-threaded member capable of matingly engaging with said first non-threaded member;
  at least one of the said first and second non-threaded members being at least partially coated with a resealable coating composition; and
(c) matingly engaging said first and second non-threaded members.

The resealable coating composition substantially fills the matingly engaging space between the first and the second non-threaded members. The resealable coating composition is a hot melt adhesive characterized as having (1) a removal torque of from about 4 to about 20, measured in accordance to ASTM D2063; and (2) a resealability torque of from about 2 to about 15 in-lb, measured in accordance to ASTM D2063.

DETAILED DESCRIPTION OF THE INVENTION

Figure 1:
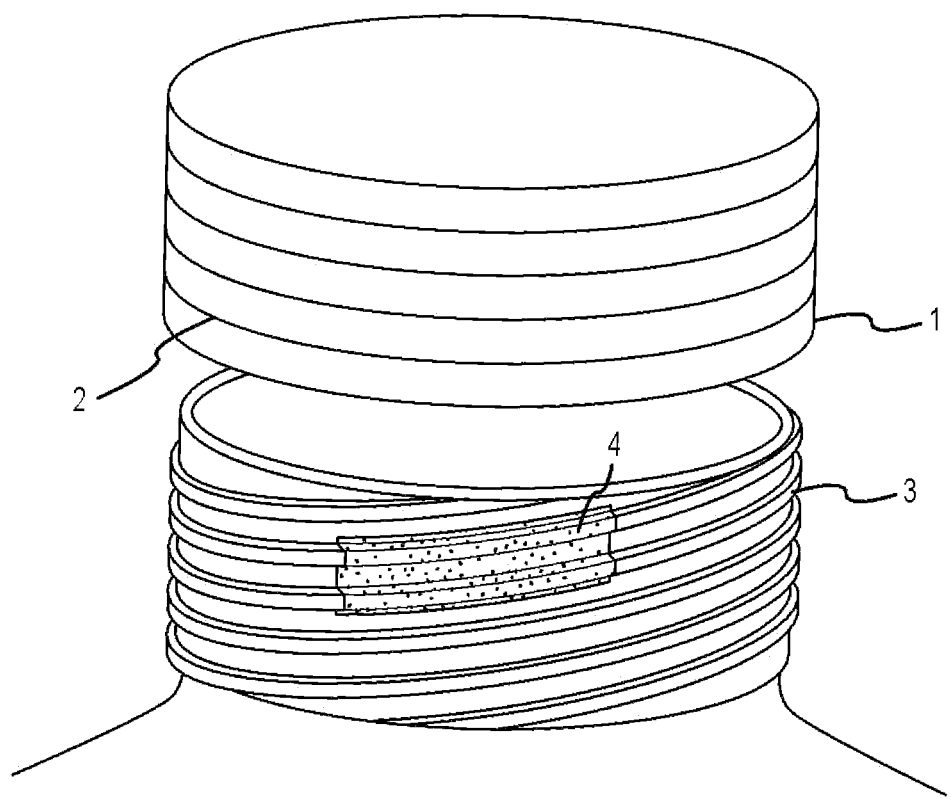
FIG. 1 is a drawing of a threaded cap and a resealable adhesive-lined threaded neck.

The present invention provides resealable adhesive-lined closure without additional device designed to seal off the opening and prevent loss of its content of a container. The resealable adhesive-lined closure is free of gaskets, induction seal liner, inner seal, valve seal or liners, which are typically made of metals, plastic, foam, paper and/or foil. The resealable adhesive-lined closures are useful for both threaded and non-threaded closures.

The term "application torque" is the torque force measured in inch-pounds, required to screw a closure onto a container.

The term "back-off" denotes relaxation of forward thrust or the loss of torque following application of the closure. This can be affected by top loading, compressibility and resiliency of the closure liner, consistency of the application torque, and mechanical interaction of the closure and bottle.

The term, "removal torque" is the amount of force necessary to loosen, open, unscrew or remove a closure from a container for the first time after closing with a specific application torque.

The term, "reapplication torque" is the amount of torque reapplied to close the container.

The term, "resealability torque" is the amount of force necessary to re-loosen, re-open, re-unscrew or remove a closure after reapplication torque was applied to the closure, which measures subsequent open torques.

The terms, "container" and "package," interchangeably used, is a medium that holds the content, and including liquid, gel and solid.

The present invention relates to adhesively fixturing matably engageable threaded and its complementary threaded members, so that the closures members are adhesively bonded and maintain a removal torque of from about 4 to about 20 in-lb, measured in accordance to ASTM D2063. Moreover, the resealable adhesive provides resealability and maintains torque on subsequent openings of from about 2 to about 15 in-lb, measured in accordance to ASTM D2063. Importantly, the resealable adhesive can retain from about 40% to 100% of the reapplication torque.

The present invention is also related to adhesively fixturing matably engageable non-threaded and its complementary non-threaded members with the same removal torque and resealability values as above.

The addition of the resealable adhesive locks and seals the members once application torque is applied onto the members. Such resealable adhesive significantly increases the torque required to break or turn the engaged threaded and non-threaded members of the container, and provides leak and spill proof for containers without additional liners. A typical torque value of about 4 to about 20 in-lb allows for hand removal of the joined members. Values greater than about 20 in-lb would typically require additional tool to separate the members. Values less than about 2 in-lb may rupture the seal and cause contents to leak.

The resealable adhesives of the present invention have large gap-filling capabilities, are non-messy, do not drip, may be applied to container surfaces, and stored prior to use.

The resealable adhesive is a hot melt adhesive. Typically, the hot melt adhesive includes a polymer, tackifier, optionally a wax, diluent/plasticizer, anti-oxidant and other additives. Polymers include (1) olefin copolymer block copolymer and random copolymer produced by metallocene catalysis polymerization, (2) hydrogenated styrene block copolymer, which is substantially saturated materials having styrene end-blocks and ethylene-butylene, ethylene-propylene, butylene-butene or isobutylene mid-blocks and having a di-block content of less than about 70%, a di-block content of preferably less than about 50% and more preferably less than about 30%, (3) amorphous poly-α-olefin polymer that includes random copolymers or terpolymers of ethylene, propylene, and butene, and other substantially amorphous or semi-crystalline propylene-ethylene polymers, (4) polyester copolymers, and (5) ethylene vinyl acetate containing from about 15 to about 50% by weight of vinyl acetate and ethylene-n-butyl acrylate contents.

In one embodiment, the polymer or a mixture of polymer content is present from about 10 to about 70 wt. %, preferably from about 15 to about 45 wt. %, based on the total weight of the hot melt adhesive.

The desirability and selection of the particular tackifying agent or tackifier can depend upon the specific types of polymer employed. Suitable tackifiers include any compatible resins or mixtures thereof such as (1) natural or modified rosins such, for example, as gum rosin, wood rosin, tall oil rosin, distilled rosin, hydrogenated rosin, dimerized rosin, and polymerized rosin; (2) glycerol and pentaerythritol esters of natural or modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, e.g., styrene/terpene and alpha-methyl styrene/terpene; (4) polyterpene resins having a softening point, as determined by ASTM method E28-18, of from about 80° to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof, for example, as the resin product resulting from the condensation, in an acidic medium, of a bicyclic terpene and phenol; (6) aliphatic petroleum hydrocarbon resins having a Ball and Ring softening point of from about 70° to 135° C.; the latter resins resulting from the polymerization of monomers consisting of primarily of olefins and diolefins; also included are the hydrogenated aliphatic petroleum hydrocarbon resins; (7) alicyclic petroleum hydrocarbon resins and the hydrogenated derivatives thereof; and (8) aliphatic/aromatic or cycloaliphatic/aromatic copolymers and their hydrogenated derivatives.

In one embodiment, the tackifier or a mixture of tackifier content is present from about 5 to about 60 wt. %, based on the total weight of the hot melt adhesive.

Waxes include petroleum based, conventional wax, natural-based wax, functionalized wax, and low molecular weight polyolefin copolymers may be used in the practice of the invention.

In one embodiment, the wax or a mixture of wax content is present from about 10 to about 60 wt. %, based on the total weight of the hot melt adhesive.

Diluent is defined, herein as an oil, plasticizer, liquid tackifier (having a Ring and Ball softening point below about 25° C.), synthetic liquid oligomer, and mixtures thereof.

The diluent or a mixture of diluent content is optionally present up to about 10 wt. %, based on the total weight of the hot melt adhesive.

An antioxidant or stabilizer may also be included in the hot melt adhesive in amounts of up to about 3% by weight, more typically in amounts of up about 1%.

Other additives conventionally used in hot melt adhesives to satisfy different properties and meet specific application requirements also may be added to the adhesive composition of this invention. Such additives include, for example, fillers, microspheres pigments, flow modifiers, dyestuffs, anti-corrosion agents, lubricating agents (such as greases, oils and waxes) and/or coupling agents, which may be incorporated in minor or larger amounts into the adhesive, depending on the purpose.

The other additives, depending on the purpose of application requirements, may be present up to 30 wt. %, based on the total weight of the hot melt adhesive.

Exemplary hot melt adhesive includes rubber-based adhesive, ethylene vinyl acetate-based adhesive, metallocene-catalyzed olefin-based adhesive and Ziegler-Natta catalyzed olefin-based adhesive.

Regardless of the specific formulation, the hot melt adhesive formulation has sufficient viscosity and sag-resistance to permit ready application of the adhesive to the threads and non-threads of the mateable member at its molten state, without subsequent dripping, sagging or displacement of the adhesive prior to mating and locking its complementary member. In one embodiment, the hot melt adhesive is a low application temperature adhesive to decrease charring substrate members. In another embodiment, the hot melt adhesive has pressure sensitive properties. The resealable adhesive is preapplied onto the surface area of a member to be engaged with complementary mating member, and such preapplied medium may then be cooled and/or set in any suitable manner, e.g., by ambient (room temperature) or lower temperature to hasten hardening of the molten hot melt adhesive. In another embodiment, the hot melt adhesive is applied in a powder or non-molten state onto the member, and adhesive-applied-member is heated.

The contents of the hot melt adhesive are combined as known in the art, and applied onto at least a portion of the threaded or non-threaded member and dried. A sufficient amount of the hot melt adhesive is applied onto a threaded or non-threaded member, and when the member is matingly engaged with its complementary member, the hot melt adhesive is coated between the two members, fills the gap between the two members, and provides removal torque.

As shown in FIG. 1, hot melt adhesive (4) is applied onto an area (3) of the threaded neck. The neck member matingly engages onto the threads (2) of the cap (1).

Figure 2:
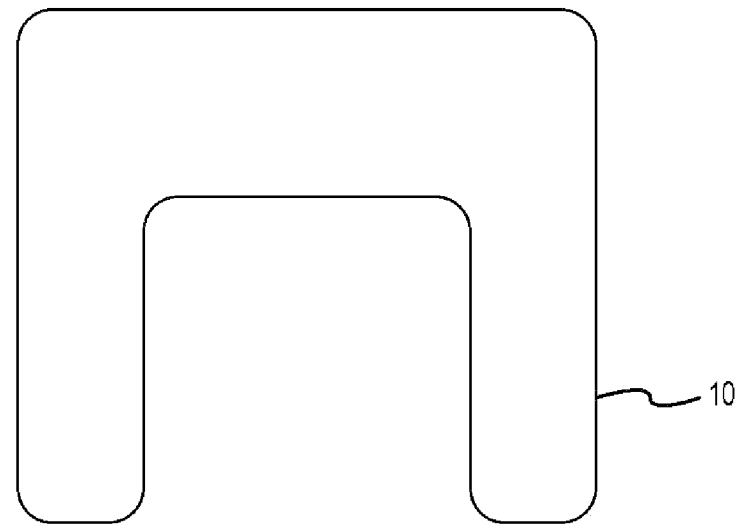
FIG. 2 is a drawing of a non-threaded cap and a resealable adhesive-lined non-threaded neck.
Figure 2:
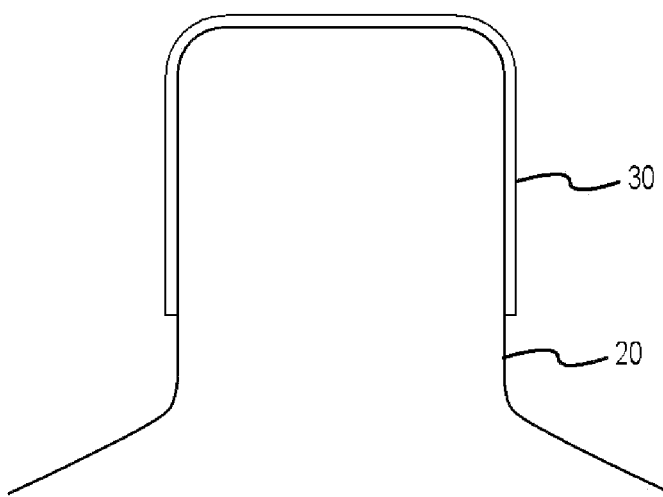

Also as shown in FIG. 2, hot melt adhesive (30) is applied onto the neck (20). The neck fits matingly onto the cap (10).

Once applied to one of the members, the resealable adhesive remains on the surface of the threaded or the non-threaded member until mated to its complementary member. In use, the member with the preapplied resealable adhesive thereon is contacted with mating surface of the complementarily member, which optimally may have resealable adhesive previously applied to the surface of the complementary member thereof, to facilitate the fixation of the engaged member. In such manner, a differential pressure is applied to the matably engaged members.

In one embodiment, the resealable adhesive may be applied by onto the surface of one of the closure members, at a coating level of from about 0.001 to about 1 g/in$^2$, preferably from about 0.01 to about 0.7 g/in$^2$, more preferably from about 0.02 to about 0.5 g/in$^2$.

The resealable adhesive may be applied in any suitable manner, such as for example by extrusion, spraying, dipping, roller coating, contact application or in any other suitable manner, depending on the thickness, flow and viscosity characteristics desired or present in the specific end use application of the composition. Uniform thickness of the resealable adhesive at the closure member is desirable; however, nonuniform thickness can become more uniform under application force, where mating the two members will squeeze the resealable adhesive together to form a desirable seal.

In some embodiment, the resealable adhesive is clear or water-white. In other embodiment, pigment is added to tint or dye the color of the resealable adhesive to match the container color.

In another embodiment, the invention is a method for adhesively bonding threaded or non-threaded member, by the steps of:
 (a) providing a first threaded or non-threaded member;
 (b) providing a second threaded or non-threaded member capable of matingly engaging with said first member;
  at least one of the said first and second members being at least partially coated with a resealable coating composition; and
 (d) matingly engaging said first and second threaded members.

The resealable coating composition substantially fills the matingly engaging space between the first and the second members. The resealable coating composition is a hot melt adhesive characterized as having a removal torque of (1) from about 4 to about 20 in-lb, measured in accordance to ASTM D2063; and (2) resealability torque of from about 2 to about 15 in-lb, measured in accordance to ASTM D2063.

The present invention may be used in place of or in addition to bags, tapes, films, strips, gaskets, pads, strings, and various other shaped pieces, which may be applied to container closure members.

The container closure members with which the invention may be carried out includes any structural elements, e.g., cap and closure, screw tops, snap fastener elements, tongue-and-groove fastener elements, hook-and-loop fastener elements, press-fit elements, pump dispensers, etc., which are adhesively bondably engageable with a complementary mating structure. The closure member and complementary member may thus comprise a cap and closure assembly, which are threadably or non-threadably engaged and have the resealable adhesive filled in the gap between the matingly engaged members.

The present invention is useful as caps, lid, and closures, and may be formed as container (bottle) necks, screw caps, roll on Pilfer proof closures, security closures, dispensing and dosing closure, trigger spray closure, security closures, valve closures, tube caps, tamper evident closures, sports caps, snap hinge caps, screw caps, push pull closures, pours and dropper closures, child resistant closures, and the like.

The above caps and closures are typically made from polypropylene, polyethylene, high density polyethylene, low density polyethylene, polyvinyl chloride and/or polyethylene terephthalate.

EXAMPLES

All torque values were measured on Mark 10, model MTT 01-50 in accordance with ASTM D2063.

Sample hot melt adhesive tested was formulated with ethylene vinyl acetate polymer (30 wt. %), tackifier (60%), wax (8%) and additives (2%).

Various coating weight (in grams per inch square) of the sample adhesive, in molten state, was applied onto a first threaded member.

At least 3 threaded members were conditioned at room temperature (21-25° C.), for 24 hours and each member was threaded to its mateable second threaded member by hand (application force). The mated members were then tested for removal torque and recorded in Table 1.

Once removed, each were reclosed with a specified re-application torque, and tested for resealability torque with the same tester. The resealability torques values and the percent retained torque are also listed in Table 1.

TABLE 1

| Coating weight (g/in$^2$) | Removal torque (lb-in) | Re-application torque (lb-in) | Resealability torque (lb-in) | % retained torque (%) |
|---|---|---|---|---|
| 0.047 | 6.5 | 12.4 | 7.4 | 60 |
| 0.058 | 7.7 | 11.5 | 5.4 | 47 |
| 0.070 | 6.3 | 12 | 6.5 | 54 |
| 0.268 | 32.2 | NA | NA | NA |
| 0.291 | 33.0 | NA | NA | NA |
| 0.303 | 34.6 | NA | NA | NA |

Coating weights of the first three samples allowed for removal torque and realability torque within the range of hand openability. Also, the resealable adhesive retained torque of greater than about 47%.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. An article of manufacture comprising
a first threaded member, and
a second threaded member, matingly engaged with said first threaded member,
wherein the threads of said first threaded member are at least partially coated with a resealable adhesive comprising a hot melt adhesive; and
wherein the resealable adhesive is characterized as having (1) a removal torque of from about 4 to about 20 in-lb, measured in accordance to ASTM D2063, and (2) a resealability torque of from about 2 to about 15 in-lb, measured in accordance to ASTM D2063.

2. The article of manufacture of claim 1, wherein the hot melt adhesive comprises a rubber-based adhesive, ethylene vinyl acetate-based adhesive, metallocene-catalyzed olefin-based adhesive or Ziegler-Natta catalyzed olefin-based adhesive.

3. The article of manufacture of claim 1, wherein the first or the second threaded member is independently made of polypropylene, polyethylene, high density polyethylene, low density polyethylene, polyvinyl chloride or polyethylene terephthalate.

4. The article of manufacture of claim 1, wherein the first threaded member is a cap, lid or closure.

5. The article of manufacture of claim 1, wherein the first threaded member is a container neck or bottle neck.

6. An article of manufacture comprising a first non-threaded closure member having an area of a circumference or perimeter dimension and a height dimension,
wherein the area of the closure member is at least partially coated with a resealable adhesive comprising a hot melt adhesive, further comprising a second non-threaded member matingly engaged with the area of said first non-threaded member, whereupon the resealable adhesive is coated between the first and the second non-threaded members; wherein the resealable adhesive is characterized as having a removal torque of from about 4 to about 20 in-lb, measured in accordance to ASTM D2063; wherein the threaded member has a resealability torque of from about 2 to about 15 in-lb, measured in accordance to ASTM D2063.

7. The article of manufacture of claim 6, wherein the hot melt adhesive comprises a rubber-based adhesive, ethylene vinyl acetate-based adhesive, metallocene-catalyzed olefin-based adhesive or Ziegler-Natta catalyzed olefin-based adhesive.

8. The article of manufacture of claim 6, wherein the first or the second non-threaded member is independently made of polypropylene, polyethylene, high density polyethylene, low density polyethylene, polyvinyl chloride or polyethylene terephthalate.

9. The article of manufacture of claim 6, wherein the first non-threaded member is a cap, lid or closure.

10. The article of manufacture of claim 6, wherein the first non-threaded member is a container neck or bottle neck.

11. A method of sealing members comprising:
a. providing a first member;
b. providing a second member capable of matingly engaging with said first member;
at least one of the said first and second members being at least partially coated with a resealable coating composition;
c. matingly engaging said first and second members,
whereupon the resealable coating composition substantially fills the matingly engaging space between the first and the second members;
wherein the resealable coating composition is a hot melt adhesive characterized as having a removal torque of from about 4 to about 20 in-lb, measured in accordance to ASTM D2063;
wherein the resealable adhesive has a resealability torque of from about 2 to about 15 in-lb, measured in accordance to ASTM D2063.

12. The method of sealing members of claim 11, wherein the first or the second member is independently made of polypropylene, polyethylene, high density polyethylene, low density polyethylene, polyvinyl chloride or polyethylene terephthalate.

13. The method of sealing members of claim 11, wherein at least one of the said first and second members is a cap, lid or closure.

14. The method of sealing members of claim 11, wherein the first and the second members are threaded members.

15. The method of sealing members of claim 11, where in the first and the second members are non-threaded members.

* * * * *